(12) United States Patent
Halbersberg et al.

(10) Patent No.: US 10,061,637 B1
(45) Date of Patent: Aug. 28, 2018

(54) SYSTEM, METHOD, AND COMPUTER PROGRAM FOR AUTOMATIC ROOT CAUSE ANALYSIS

(71) Applicant: Amdocs Development Limited, Limassol (CY)

(72) Inventors: Dan Halbersberg, Tel Aviv (IL); Vivi Miranda, Raanana (IL); Eitan Gal, Tel-Aviv (IL)

(73) Assignee: AMDOCS DEVELOPMENT LIMITED, Limassol (CY)

( * ) Notice: Subject to any disclaimer, the term of this patent is extended or adjusted under 35 U.S.C. 154(b) by 94 days.

(21) Appl. No.: 15/410,623

(22) Filed: Jan. 19, 2017

(51) Int. Cl.
*G06F 11/00* (2006.01)
*G06F 11/07* (2006.01)

(52) U.S. Cl.
CPC ........ *G06F 11/079* (2013.01); *G06F 11/0751* (2013.01); *G06F 11/0787* (2013.01)

(58) Field of Classification Search
USPC .......................................................... 714/37
See application file for complete search history.

(56) References Cited

U.S. PATENT DOCUMENTS

| | | | |
|---|---|---|---|
| 6,778,709 B1 * | 8/2004 | Taubman | H04N 19/70 348/395.1 |
| 8,301,613 B2 | 10/2012 | Grabarnik et al. | |
| 9,294,631 B1 | 3/2016 | Cogan et al. | |
| 2004/0111438 A1 * | 6/2004 | Chitrapura | G06F 17/30 |
| 2008/0183649 A1 * | 7/2008 | Farahani | G06F 17/2715 706/14 |
| 2012/0271542 A1 * | 10/2012 | Arcot | G01C 21/3492 701/411 |

(Continued)

OTHER PUBLICATIONS

Mohamed et al., "A New Probing Scheme for Fault Detection and Identification," Electro/Information Technology, eit 09, IEEE International Conference, 2009, pp. 90-95.

(Continued)

*Primary Examiner* — Sarai E Butler
(74) *Attorney, Agent, or Firm* — Zilka-Kotab, PC

(57) ABSTRACT

A system, method, and computer program product are provided for automatic root cause analysis. In operation, a root cause analysis system identifies at least one event associated with one or more records for which to perform a root cause analysis. The root cause analysis system performs a root cause analysis of the event by automatically generating a decision tree based on all records in the current time-window such that each leaf in the decision tree represents the probabilities for class labels of a target variable and each branch in the decision tree represents a feature that leads to a corresponding class label probability. The root cause analysis system automatically generates the decision tree by automatically selecting at each step the feature that maximizes information gain based on a current subset of data. The root cause analysis system then classifies which conditioned feature is a causal factor and which is a root cause of the event by using a conditional entropy equation on each branch leading to the tree leaf. The root cause analysis is repeatedly performed on sequential time-window sets of records gathered, per a sufficiently small time window for near-real-time root cause detection, yet sufficiently large records set for statistical significance.

20 Claims, 8 Drawing Sheets

(56) References Cited

U.S. PATENT DOCUMENTS

| | | | | |
|---|---|---|---|---|
| 2013/0097463 A1* | 4/2013 | Marvasti | ............... | G06F 11/079 |
| | | | | 714/47.1 |
| 2013/0127900 A1* | 5/2013 | Pena | ....................... | G09G 5/003 |
| | | | | 345/619 |
| 2015/0012465 A1* | 1/2015 | Pingenot | ................ | G06N 5/025 |
| | | | | 706/12 |
| 2017/0116228 A1* | 4/2017 | Alberg | .............. | G06F 17/30294 |

OTHER PUBLICATIONS

Rish et al., "Adaptive diagnosis in distributed systems," IEEE Transactions on Neural Networks, vol. 16, Issue 5, Sep. 2005, pp. 1-22.

Balagani et al., "On Guo and Nixon's Criterion for Feature Subset Selection: Assumptions, Implications, and Alternative Options," IEEE Transactions on Systems, Man, and Cybernetics—Part A: Systems and Humans, vol. 40, Issue 3, May 2010, pp. 651-655.

Amrutkar et al., "Why is My Smartphone Slow? On the Fly Diagnosis of Underperformance on the Mobile Internet," 43rd Annual IEEE/IFIP International Conference on Dependable Systems and Networks (DSN), 2013, pp. 1-8.

Su et al., "A Fast Decision Tree Learning Algorithm," AAAI, 2006, pp. 500-506.

Connelly, L. M., "Root Cause Analysis," Medsurg Nursing, vol. 21, No. 5, Sep./Oct. 2012, pp. 313-316.

\* cited by examiner

SYSTEM, METHOD, AND COMPUTER PROGRAM FOR AUTOMATIC ROOT CAUSE ANALYSIS

FIELD OF THE INVENTION

The present invention relates to utilizing an efficient root cause analysis technique to determine root causes of faults or defects.

BACKGROUND

Root cause analysis (RCA) is defined as a process of identifying the cause or causes of a fault or a defect. There are two types of causes: a causal factor and a root cause. A causal factor affects the outcome of an event but is not a root cause, thus, removing a casual factor will not prevent the recurrence of the fault. A root cause is a cause that when removed will prevent the final undesirable outcome from recurring.

Usually, root cause analysis includes analyzing a sequence of events ending with a fault, mostly with an expected timed order. However, in some systems the data related to the fault is static, yet the root cause determination of faults in such cases are still required. To date, there is not an efficient root cause analysis technique or analysis system for analyzing static data in real-time or near real-time.

There is thus a need for addressing these and/or other issues associated with the prior art.

SUMMARY

A system, method, and computer program product are provided for automatic root cause analysis. In operation, a root cause analysis system identifies at least one event associated with one or more records for which to perform a root cause analysis. The root cause analysis system performs a root cause analysis of the event by automatically generating a decision tree based on all records in a current time-window such that each leaf in the decision tree represents the probabilities for class labels of a target variable and each branch in the decision tree represents a feature that leads to a corresponding class label probability. The root cause analysis system automatically generates the decision tree by automatically selecting at each step the feature that maximizes information gain based on a current subset of data. The root cause analysis system then classifies which conditioned feature is a causal factor and which is a root cause of the event by using a conditional entropy equation on each branch leading to the tree leaf. The root cause analysis is repeatedly performed on sequential time-window sets of records gathered, per a sufficiently small time window for near-real-time root cause detection, yet sufficiently large records set for statistical significance.

DETAILED DESCRIPTION

Figure 1:
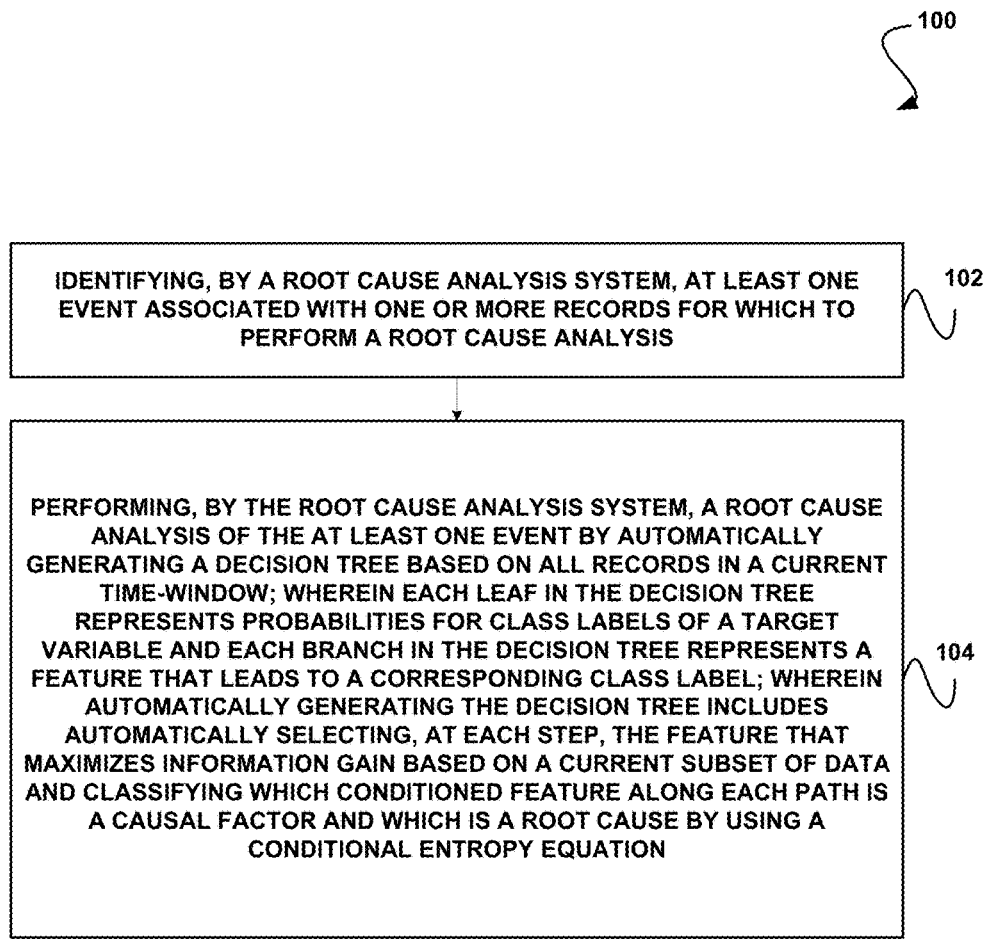
FIG. 1 illustrates a method for automatic root cause analysis, in accordance with one embodiment.

FIG. 1 illustrates a method 100 for automatic root cause analysis, in accordance with one embodiment.

In operation, a root cause analysis system identifies at least one event associated with one or more records for which to perform a root cause analysis. See operation 102.

The records may be associated with any number of industries, such as the telecommunications industry, the retail industry, the health care industry, and/or various other industries. For example, in one embodiment, the records may include call detail records (CDRs) associated with a communication service provider (CSP). The event may include any type of defect, fault, or issue. For example, in various embodiments, the event may be associated with customer churn, process quality assurance and optimization, a failure in order activation, and/or various other issues.

In various embodiments, the root cause analysis system may identify the event automatically in response to an alert (e.g. a real-time fault alert, etc.), in response to identifying an event in stored data (e.g. data stored in a database, etc.), and/or in response to a user identifying an event to analyze (e.g. utilizing a user interface associated with the root cause analysis system, etc.).

The root cause analysis system performs a root cause analysis of the event by automatically generating a decision tree based on all records in a current time window such that each leaf in the decision tree represents the probabilities for class labels of a target variable and each branch in the decision tree represents a feature that leads to a corresponding class label. See operation 104. The root cause analysis is repeatedly performed on sequential time-window sets of records gathered, per a sufficiently small time window for near-real-time root cause detection, yet sufficiently large records set for statistical significance. The current time window may be in seconds, minutes, or hours.

The class label may refer to any target variable and may include, for example, FAILED\SUCCESS call or BAD\GOOD customer detail record, etc. The feature that leads to a corresponding class label may include any information associated with a category, such as male/female in association with a gender category. Of course, male/female is merely one simplified example of a potential feature. The superset of conditioned features are all the identified possible root causes in the specific industry and task.

The root cause analysis system automatically generates the decision tree by automatically selecting at each step a conditioned feature that maximizes information gain based on a current subset of data.

The root cause analysis system analyzes each path (from root to leaf) and for each path classifies which conditioned feature is a causal factor and which is a root cause of the event by using a conditional entropy equation.

It should be noted that the method 100 may be implemented utilizing various systems, hardware, software, applications, user interfaces, etc., as dictated by the implementer. For example, the root cause analysis system may include one or more processors, databases, etc., as well as implement various logic, computer code, applications, and/or user interfaces, etc.

More illustrative information will now be set forth regarding various optional architectures and uses in which the foregoing method may or may not be implemented, per the desires of the user. It should be strongly noted that the following information is set forth for illustrative purposes and should not be construed as limiting in any manner. Any of the following features may be optionally incorporated with or without the exclusion of other features described.

Figure 2:
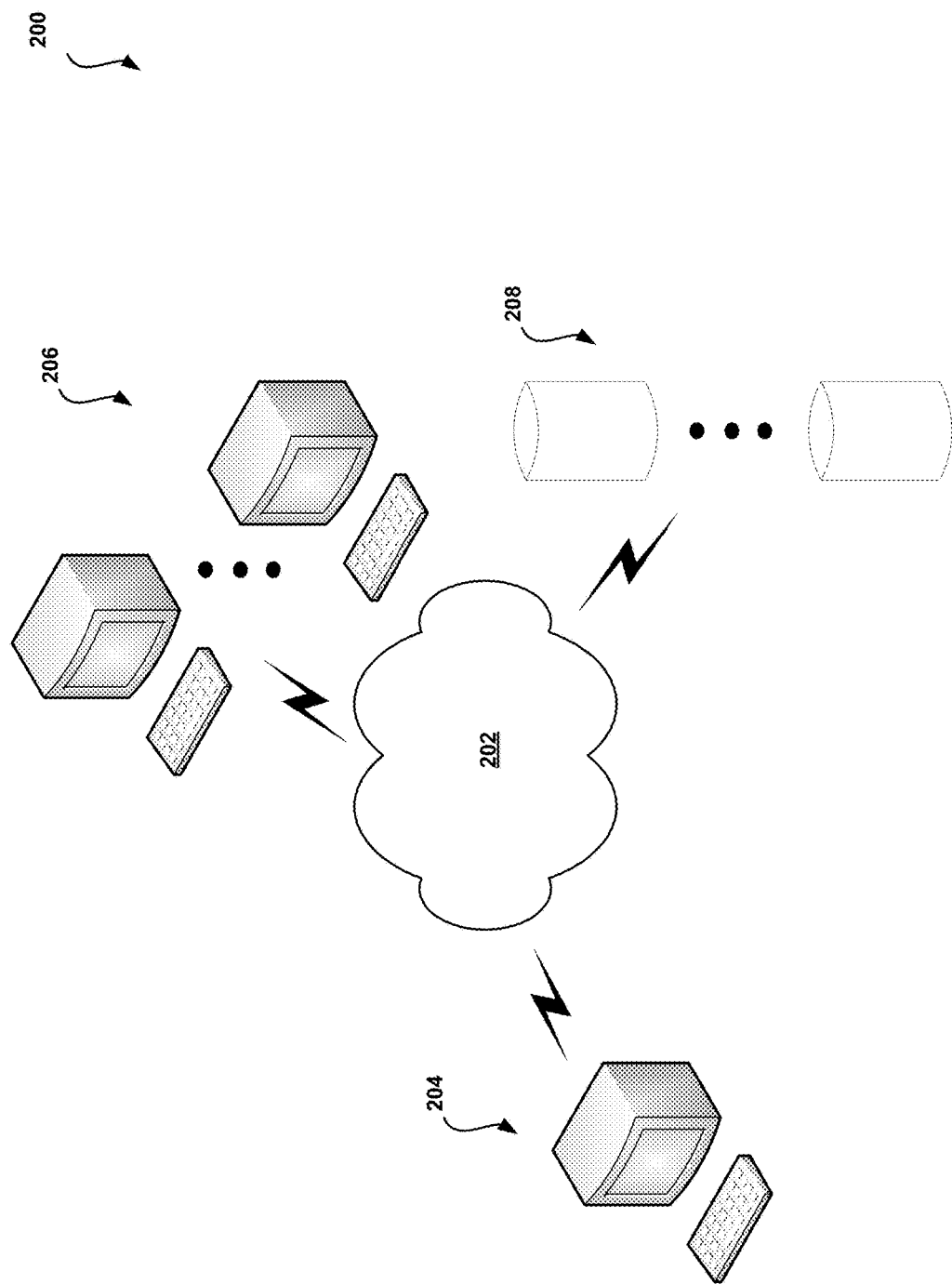
FIG. 2 shows a system for automatic root cause analysis, in accordance with one embodiment.

FIG. 2 shows a system 200 for automatic root cause analysis, in accordance with one embodiment. As an option, the system 200 may be implemented in the context of the details of the previous figure and/or any subsequent figure(s). Of course, however, the system 200 may be implemented in the context of any desired environment. Further, the aforementioned definitions may equally apply to the description below.

As shown, the system 200 includes a root cause analysis system 204 which may implement a variety of applications or software, etc. The root cause analysis system 204 may be capable of communicating with a plurality of systems 206, either directly or over one or more networks 202, for performing root cause analysis of various events (e.g. faults, defects, etc.). The root cause analysis system 204 is also in communication with one or more repositories 208, which may include records (e.g. call detail records, etc.) that may be analyzed to determine root causes by the root cause analysis system 204.

The root cause analysis system 204 may implement the automatic root cause analysis technique described herein to analyze faults associated with various events, such as alarm fault detection, churn, and network issue detection, etc. For illustration purposes, FIG. 2 will be described in the context of network issue detection associated with the telecommunication industry, however, such figure may be viewed in the context of any number of events/industries.

Cellular network issues are something that all users may experience on a daily basis. These issues may include a "bad" or noisy phone call, a dropped call, a low signal, or a lack of ability to access the network (e.g. such as failed calls or data). This is a serious issue for communication service providers (CSP) and a major cause of a customer's low quality of experience, which leads to churn.

In recent years, communication service providers have been collecting more and more call detail records (CDRs). This data holds very valuable information and allows the communication service providers to analyze the network in a more comprehensive manner. Among other things, this data can be used for network issues detection.

The root cause analysis system 204 implements a method including an analytical solution that discovers root causes based on a classification tree (CT) algorithm. In traditional classification tree algorithms, each case (i.e. record) is assigned to a single path in the tree, however, it is unknown which features along the path is more important and even critical for the specific case classification (i.e. its root cause), and only a global feature importance is calculated. The output of the root cause analysis algorithm implemented by the root cause analysis system 204 will assign root causes to each case (i.e. record). Such solution is general and can be used for root cause analysis in many domains and products.

In order to determine the root causes of each case, the root cause analysis system 204 analyzes the output of any decision tree (DT).

Decision trees are widely used in statistics and machine learning for classification tasks. In these trees structures, leaves represent class labels of the target variable and branches represent a conjunction of features that lead to those class labels. In a binary decision tree (specific case of a Classification Tree) each node has exactly two children. The target variable is the feature that holds the labels of the classification problem. For network detected issues, the labels could be, for example, a FAILED\SUCCESS call or BAD\GOOD call detail record. The superset of features are pre-selected according to the possible root causes in the specific classification task.

With respect to learning the structure of a decision tree, at each step the algorithm implemented by the root cause analysis system 204 automatically selects a conditioned feature that maximizes the information gain based on the current subset of data (i.e. the conditioned feature that best separates the target variable classes). The selection of the features and hence the hierarchy of the tree is according to a global rank.

The root cause analysis system 204 uses the learned decision tree and its unique paths in order to evaluate the root causes of each path separately. By doing that, the root cause analysis system 204 is able to classify which conditioned features are a causal factor and which conditioned features are a root cause.

The motivation for this technique may be highlighted using an example. Suppose the target variable Y is binary ($Y\_i \in [BAD, GOOD]$) and the information gain function used to construct the tree is entropy, as calculated by Equation 1.

$$H(Y) = -\Sigma P(y) \cdot \text{Log } P(y) \qquad \text{Equation 1: Entropy}$$

Figure 3:
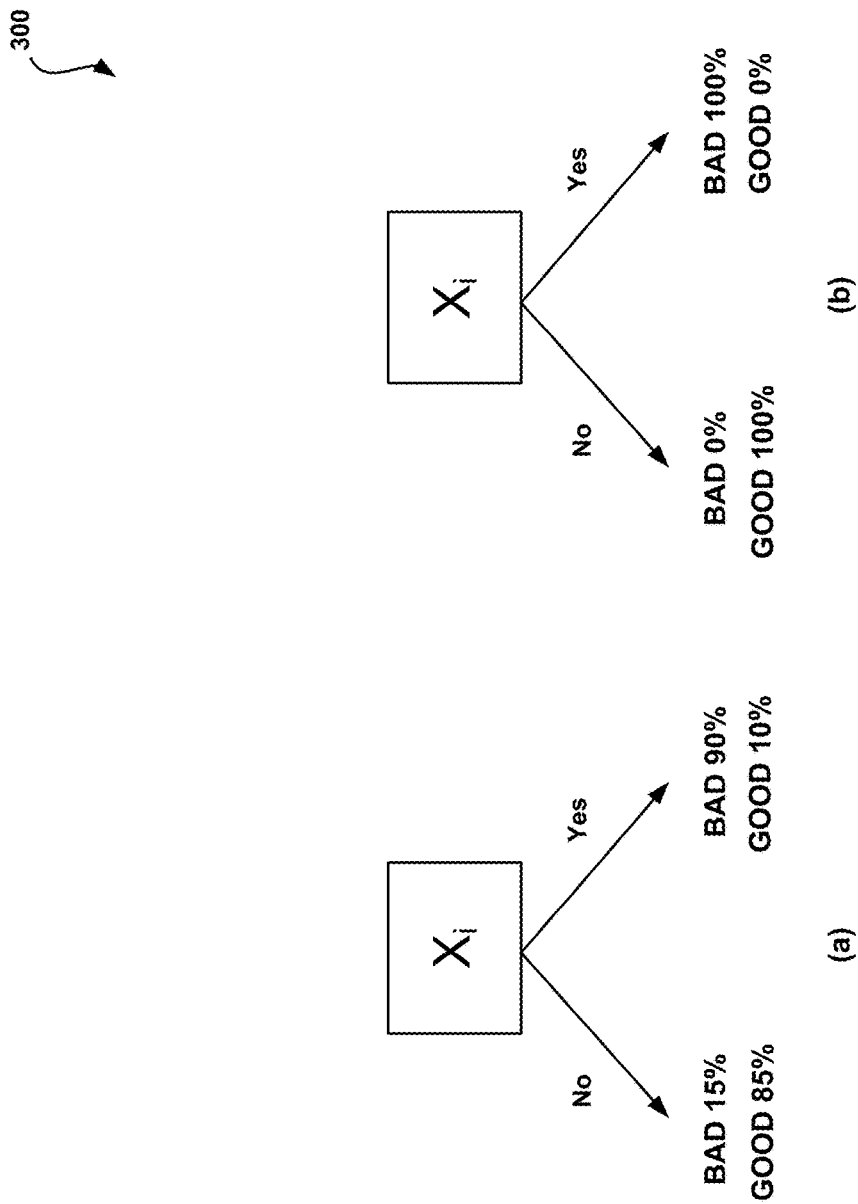
FIG. 3 shows a decision tree with Root (Xi), in accordance with an example.

FIG. 3 shows a decision tree 300 with Root (Xi), in accordance with this example. A decision tree algorithm will select as a root the feature where the sum of $P(y) \cdot \text{Log } P(y)$ over all states is minimized. In this example, the root cause analysis system 204 strives for high probability of BAD in the one branch and high probability of GOOD in the other (e.g. as shown in FIG. 3). However, in real life there is no such feature that can achieve 100% separation for the target variable (as shown in FIG. 3b). Thus, by splitting using conditioned feature $X_i$, under the GOOD labeled branch, one should expect to see some BAD samples (as shown in FIG. 3a).

Figure 4:
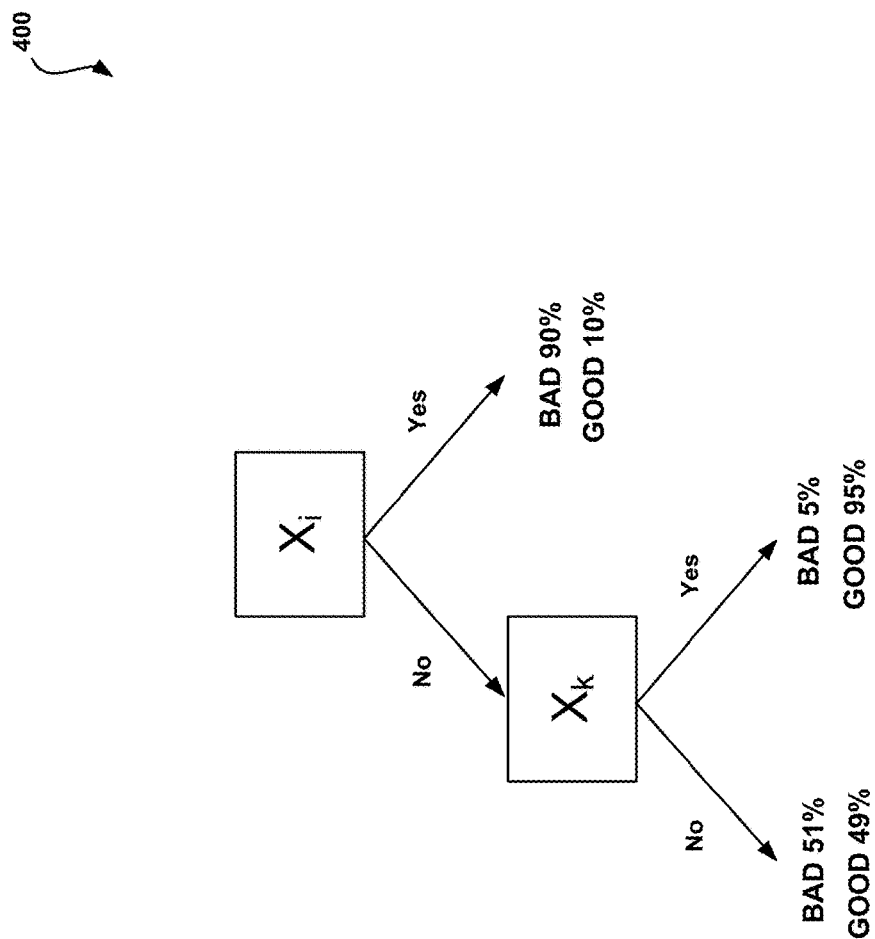
FIG. 4 shows a two levels decision tree, in accordance with an example.

Those BAD samples would be split by a second level node, on conditioned feature $X_k$ (as shown in FIG. 4), minimizing the local sum of $P(y) \cdot \text{Log } P(y)$ within the optimal split. FIG. 4 shows a second level decision tree 400, in accordance with this example.

In FIG. 4 there are three paths from the root to three distinct leaves (in general the number of paths equal the number of leaves): Path1: $X_i$=Yes; Path2: $X_i$=No→$X_k$=Yes; Path3: $X_i$=No→$X_k$=No.

In Path3, $X_i$=No labeled the samples as GOOD, whereas $X_k$ labeled the path as BAD. Therefore, it can be seen that the hierarchy of the tree does not necessarily imply the importance of the features (and their assigned value) along the path and hence cannot be used for root cause analysis. In fact, the root cause analysis system 204 inspects each path separately.

In order to find the root causes, the root cause analysis system 204 analyzes each feature in each path. For that purpose, the root cause analysis system 204 uses the Conditional Entropy as calculated by Equation 2.

Equation 2: Conditional entropy $$H(Y \mid X) = \sum P(x, y) \cdot \text{Log} \frac{P(x)}{P(x, y)}$$

The Conditional Entropy measures the entropy given another set of features' state. The root cause analysis system 204 uses the Conditional Entropy in order to measure the entropy of the target variable given a subset of the path. At each stage the root cause analysis system 204 discards one conditioned feature from the path and calculates the conditional entropy without it.

Figure 5:
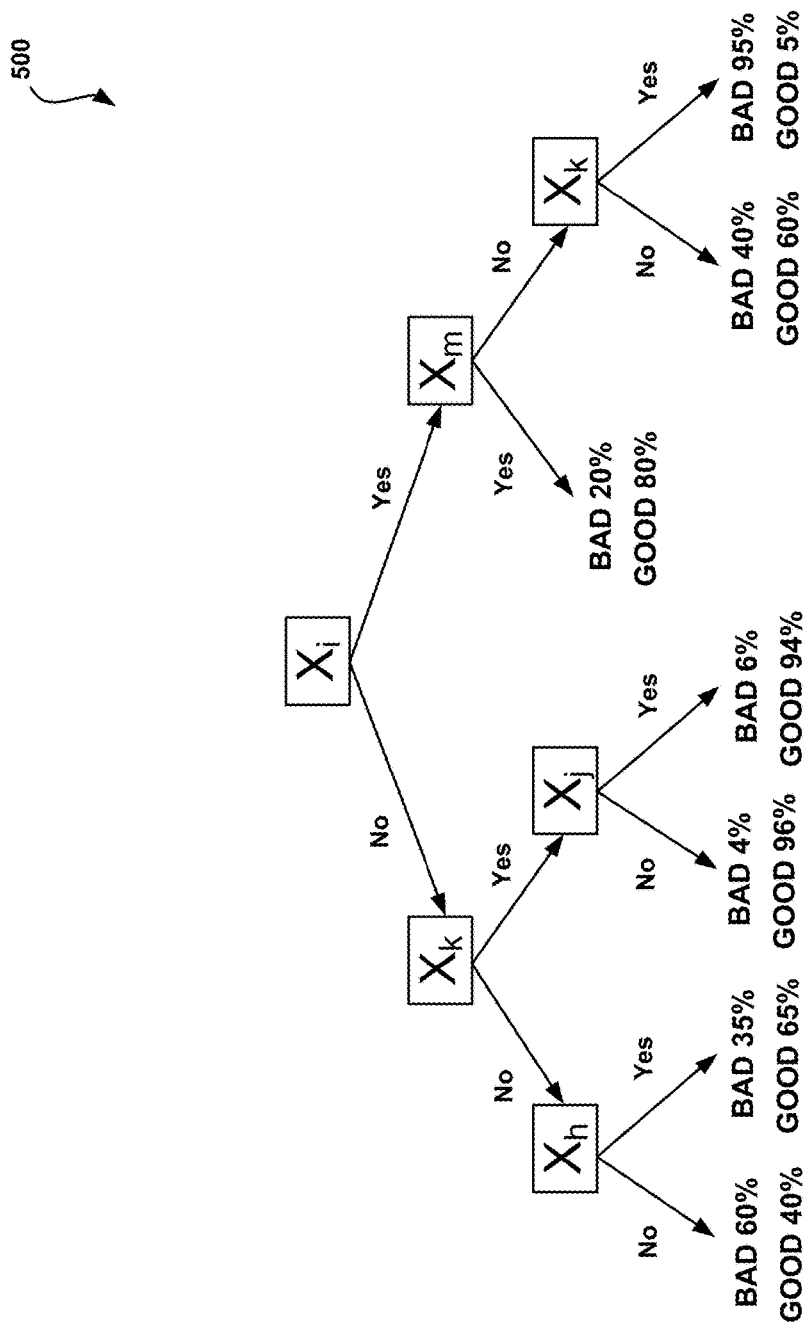
FIG. 5 shows a decision tree, in accordance with an example.

FIG. 5 shows a decision tree 500, in accordance with this example. As an example, Path1 in FIG. 5 may be denoted as: $X_i$=No $X_k$=No→$X_h$=No.

In order to determine which of the three features is likely to be the root cause of the subset (in which 60% are BAD) three calculations need to be performed by the root cause analysis system 204, as shown in Table 1.

TABLE 1

$$H(Y \mid X_k =' \text{No}', X_h =' \text{No}') =$$
$$\sum P(x_k, x_h, y) \cdot \text{Log} \frac{P(x_k, x_h)}{P(x_k, x_h, y)}$$
$$H(Y \mid X_i =' \text{No}', X_h =' \text{No}') =$$
$$\sum P(x_i, x_h, y) \cdot \text{Log} \frac{P(x_i, x_h)}{P(x_i, x_h, y)}$$
$$H(Y \mid X_i =' \text{No}', X_k =' \text{No}') =$$
$$\sum P(x_i, x_k, y) \cdot \text{Log} \frac{P(x_i, x_k)}{P(x_i, x_k, y)}$$

In one embodiment, if the entropy with the removed conditioned feature is lower than a predefined threshold (T), the root cause analysis system 204 removes the feature from the root causes list of its path and the feature is considered as causal factor. In various embodiments, there are two analysis scenarios for the root cause analysis system 204, one using a known threshold and another by ordering the conditioned features among the path by an importance score. This score should be calculated using the ratio between "without the feature conditional entropy" and "leaf entropy".

In some applications, accuracy is more important than interpretability. For example in image processing, the ability to identify objects accurately is more important (i.e. the "why" does not matter). However, in other applications, such as fault detection, the reasons are more interesting, even at the expense of lower accuracy. Random Forest or deep learning are examples of methods that yield a more accurate model but may be less interpretable in some cases. Nevertheless, in one embodiment, the root cause analysis system 204 may implement a Random Forest technique for root cause analysis.

The root cause analysis system 204 measures the features importance in each tree leaf or path separately utilizing a very fast algorithm [O(n·m)]. This allows the root cause analysis system 204 to perform real time fault detection. Network data, for instance, can be collected (e.g. from the systems 206, etc.) in near real time and be analyzed by the root cause analysis system 204 in real time.

The root cause analysis system 204 implements a generic root cause analysis approach applicable to infinite use cases. The root cause analysis technique described herein can be embedded in many products or solutions that seek to find root causes rather than just classifying a single target feature. This root cause analysis system 204 and techniques associated therewith may be implemented in many domains and applications such as customer health, churn, network health, operations or process quality assurance and optimization, and/or failure in order activation, etc.

Figure 6:
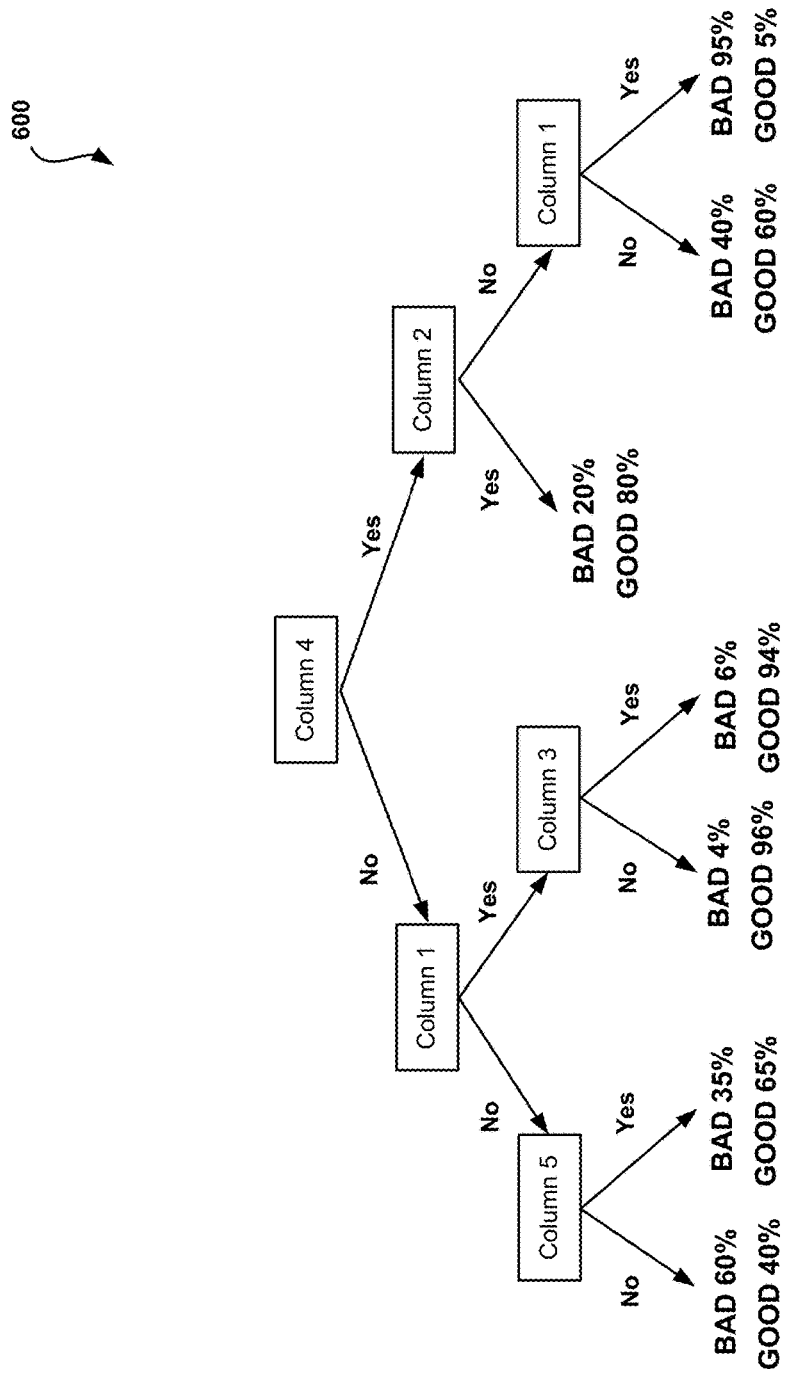
FIG. 6 shows a decision tree created by a root cause analysis system, in accordance with one embodiment.

FIG. 6 shows a decision tree 600 created by a root cause analysis system, in accordance with one embodiment. As an option, the decision tree 600 may be viewed in the context of the details of the previous figure and/or any subsequent figure(s). Of course, however, the decision tree 600 may be viewed in the context of any desired environment. Further, the aforementioned definitions may equally apply to the description below.

In operation, the root cause analysis system may receive as input a matrix with S row samples\cases and N columns attributes\features\variables. One of the columns is defined as the target variable. The values assigned to this target variable (in Table 2 below Bad\Good) are called labels. Table 2 shows one example of a potential input.

TABLE 2

|       | column 1 | column 2 | ... | column N (target) |
|-------|----------|----------|-----|-------------------|
| row 1 | Yes      | No       |     | Good              |
| row 2 | Yes      | Yes      |     | Good              |
| row 3 | No       | Yes      |     | Bad               |
| row 4 | Yes      | Yes      |     | Good              |
| ...   |          |          | ... |                   |
| row S | No       | Yes      |     | Bad               |

The root cause analysis system learns\builds\constructs the decision tree 600 from the matrix shown in Table 2. For demonstration purposes, binary variables (columns) and a binary target variable were utilized, however, any type of variables may be utilized.

A path in the tree is a list of assigned variables from the root to a leaf. For example, in this example, path number 1 is: Columns 4='No'+Columns 1='No'+Column 5='No'. This path contains all samples (row from the matrix) that meet the path's conditions. 60% out of the samples in this path are labeled as 'ad'.

Conditional entropy is a mathematical measure that quantifies the amount of information needed to describe the labels of the target variable, given the values of the other variables. This may be thought of as a score of how well a variable can explain the outcome (i.e. the label of the target variable).

Generally speaking, the root cause analysis system performs the steps shown in Table 3 in order to determine root causes.

TABLE 3

For each path in the tree "P"
    For each variable in the path "V"
        Calculate the conditional entropy of the path P without "V"
        Sort the scores and rank the variables in the path "P"
    For each sample in the path "P"- export the root causes - list of assigned
variables (values of the variables)

In other words, in each path, the root cause analysis system is looking for the variable(s), where removing it\them from the path will change the separation ('Bad'\'Good') the least. Thus, the root cause analysis system is looking for the variables that cause the maximum impact in the quality of the label prediction.

Figure 7:
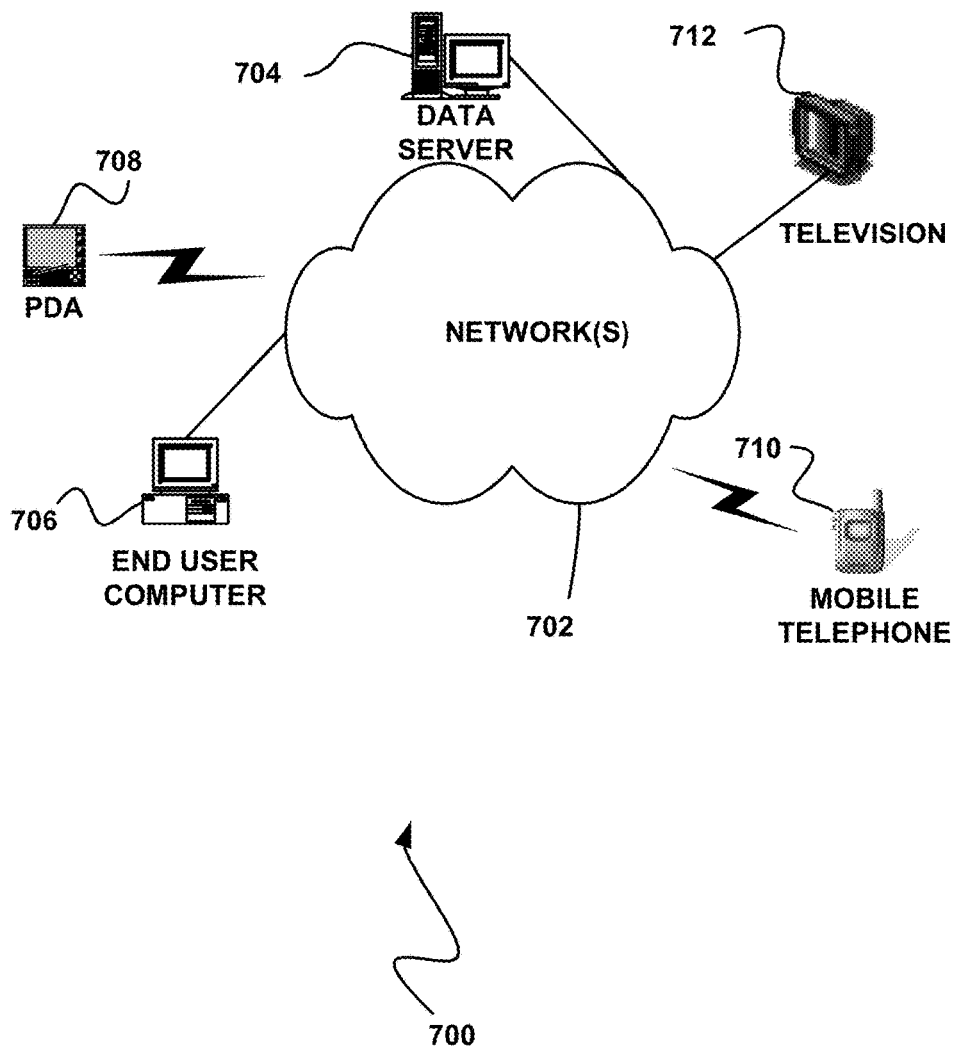
FIG. 7 illustrates a network architecture, in accordance with one possible embodiment.

FIG. 7 illustrates a network architecture 700, in accordance with one possible embodiment. As shown, at least one network 702 is provided. In the context of the present network architecture 700, the network 702 may take any form including, but not limited to a telecommunications network, a local area network (LAN), a wireless network, a wide area network (WAN) such as the Internet, peer-to-peer network, cable network, etc. While only one network is shown, it should be understood that two or more similar or different networks 702 may be provided.

Coupled to the network 702 is a plurality of devices. For example, a server computer 704 and an end user computer 706 may be coupled to the network 702 for communication purposes. Such end user computer 706 may include a desktop computer, lap-top computer, and/or any other type of logic. Still yet, various other devices may be coupled to the network 702 including a personal digital assistant (PDA) device 708, a mobile phone device 710, a television 712, etc.

Figure 8:
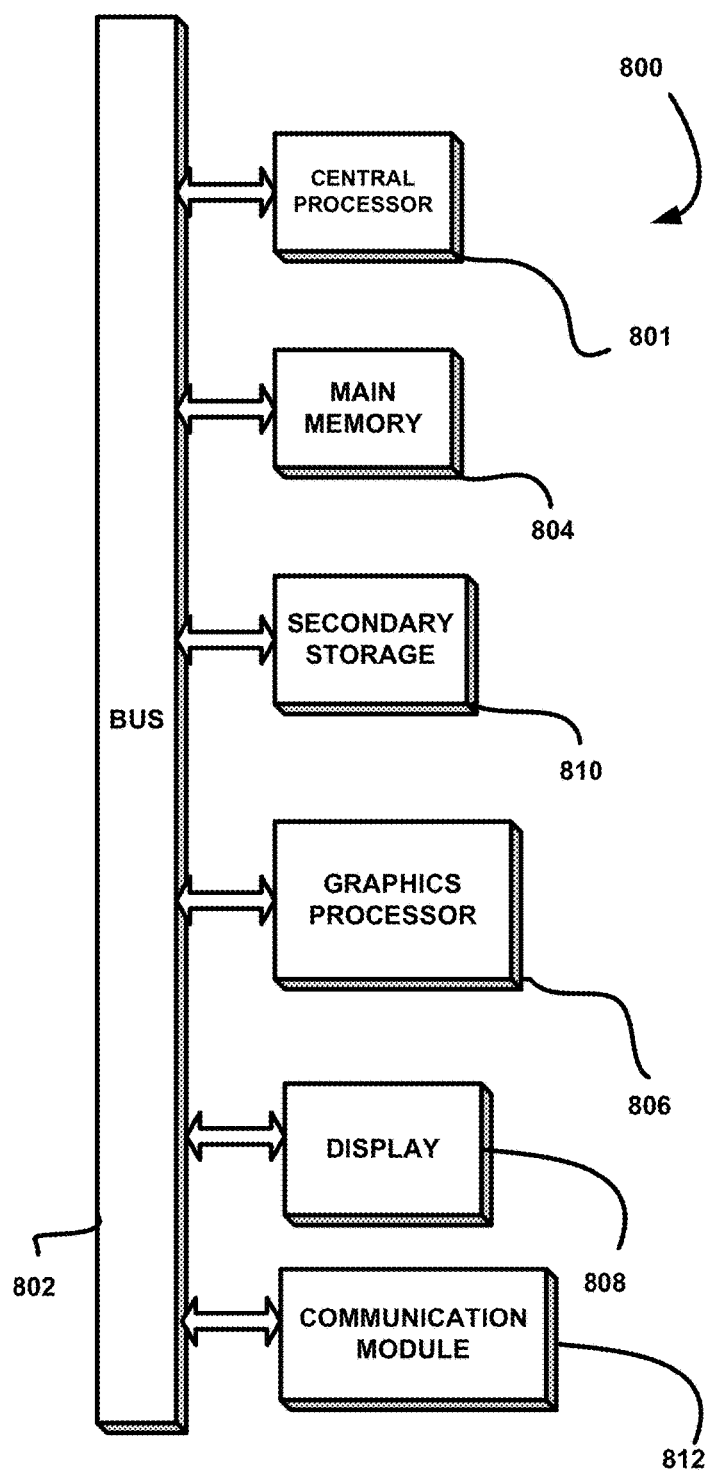
FIG. 8 illustrates an exemplary system, in accordance with one embodiment.

FIG. 8 illustrates an exemplary system 800, in accordance with one embodiment. As an option, the system 800 may be implemented in the context of any of the devices of the network architecture 700 of FIG. 7. Of course, the system 800 may be implemented in any desired environment.

As shown, a system 800 is provided including at least one central processor 801 which is connected to a communication bus 802. The system 800 also includes main memory 804 [e.g. random access memory (RAM), etc.]. The system 800 also includes a graphics processor 806 and a display 808.

The system 800 may also include a secondary storage 810. The secondary storage 810 includes, for example, a hard disk drive and/or a removable storage drive, representing a floppy disk drive, a magnetic tape drive, a compact disk drive, etc. The removable storage drive reads from and/or writes to a removable storage unit in a well-known manner.

Computer programs, or computer control logic algorithms, may be stored in the main memory 804, the secondary storage 810, and/or any other memory, for that matter. Such computer programs, when executed, enable the system 800 to perform various functions (as set forth above, for example). Memory 804, storage 810 and/or any other storage are possible examples of non-transitory computer-readable media.

The system 800 may also include one or more communication modules 812. The communication module 812 may be operable to facilitate communication between the system 800 and one or more networks, and/or with one or more devices through a variety of possible standard or proprietary communication protocols (e.g. via Bluetooth, Near Field Communication (NFC), Cellular communication, etc.).

As used here, a "computer-readable medium" includes one or more of any suitable media for storing the executable instructions of a computer program such that the instruction execution machine, system, apparatus, or device may read (or fetch) the instructions from the computer readable medium and execute the instructions for carrying out the described methods. Suitable storage formats include one or more of an electronic, magnetic, optical, and electromagnetic format. A non-exhaustive list of conventional exemplary computer readable medium includes: a portable computer diskette; a RAM; a ROM; an erasable programmable read only memory (EPROM or flash memory); optical storage devices, including a portable compact disc (CD), a portable digital video disc (DVD), a high definition DVD (HD-DVD™), a BLU-RAY disc; and the like.

It should be understood that the arrangement of components illustrated in the Figures described are exemplary and that other arrangements are possible. It should also be understood that the various system components (and means) defined by the claims, described below, and illustrated in the various block diagrams represent logical components in some systems configured according to the subject matter disclosed herein.

For example, one or more of these system components (and means) may be realized, in whole or in part, by at least some of the components illustrated in the arrangements illustrated in the described Figures. In addition, while at least one of these components are implemented at least partially as an electronic hardware component, and therefore constitutes a machine, the other components may be implemented in software that when included in an execution environment constitutes a machine, hardware, or a combination of software and hardware.

More particularly, at least one component defined by the claims is implemented at least partially as an electronic hardware component, such as an instruction execution machine (e.g., a processor-based or processor-containing machine) and/or as specialized circuits or circuitry (e.g., discreet logic gates interconnected to perform a specialized function). Other components may be implemented in software, hardware, or a combination of software and hardware. Moreover, some or all of these other components may be combined, some may be omitted altogether, and additional components may be added while still achieving the functionality described herein. Thus, the subject matter described herein may be embodied in many different variations, and all such variations are contemplated to be within the scope of what is claimed.

In the description above, the subject matter is described with reference to acts and symbolic representations of operations that are performed by one or more devices, unless indicated otherwise. As such, it will be understood that such acts and operations, which are at times referred to as being computer-executed, include the manipulation by the processor of data in a structured form. This manipulation transforms the data or maintains it at locations in the memory system of the computer, which reconfigures or otherwise alters the operation of the device in a manner well understood by those skilled in the art. The data is maintained at physical locations of the memory as data structures that have particular properties defined by the format of the data. However, while the subject matter is being described in the foregoing context, it is not meant to be limiting as those of skill in the art will appreciate that several of the acts and operations described hereinafter may also be implemented in hardware.

To facilitate an understanding of the subject matter described herein, many aspects are described in terms of sequences of actions. At least one of these aspects defined by the claims is performed by an electronic hardware component. For example, it will be recognized that the various actions may be performed by specialized circuits or circuitry, by program instructions being executed by one or more processors, or by a combination of both. The description herein of any sequence of actions is not intended to imply that the specific order described for performing that sequence must be followed. All methods described herein may be performed in any suitable order unless otherwise indicated herein or otherwise clearly contradicted by context The use of the terms "a" and "an" and "the" and similar referents in the context of describing the subject matter (particularly in the context of the following claims) are to be construed to cover both the singular and the plural, unless otherwise indicated herein or clearly contradicted by context. Recitation of ranges of values herein are merely intended to serve as a shorthand method of referring individually to each separate value falling within the range, unless otherwise indicated herein, and each separate value is incorporated into the specification as if it were individually recited herein. Furthermore, the foregoing description is for the purpose of illustration only, and not for the purpose of limitation, as the scope of protection sought is defined by the claims as set forth hereinafter together with any equivalents thereof entitled to. The use of any and all examples, or exemplary language (e.g., "such as") provided herein, is intended merely to better illustrate the subject matter and does not pose a limitation on the scope of the subject matter unless otherwise claimed. The use of the term "based on" and other like phrases indicating a condition for bringing about a result, both in the claims and in the written description, is not intended to foreclose any other conditions that bring about that result. No language in the specification should be construed as indicating any non-claimed element as essential to the practice of the invention as claimed.

The embodiments described herein included the one or more modes known to the inventor for carrying out the claimed subject matter. Of course, variations of those embodiments will become apparent to those of ordinary skill in the art upon reading the foregoing description. The inventor expects skilled artisans to employ such variations as appropriate, and the inventor intends for the claimed subject matter to be practiced otherwise than as specifically described herein. Accordingly, this claimed subject matter includes all modifications and equivalents of the subject matter recited in the claims appended hereto as permitted by applicable law. Moreover, any combination of the above-described elements in all possible variations thereof is encompassed unless otherwise indicated herein or otherwise clearly contradicted by context.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

What is claimed is:

1. A method, comprising:
   identifying, by a root cause analysis system, at least one event associated with one or more records for which to perform a root cause analysis; and
   performing, by the root cause analysis system, a root cause analysis of the at least one event by automatically generating a decision tree based on all records in a current time-window;
   wherein each leaf in the decision tree represents probabilities for class labels of a target variable and each branch in the decision tree represents a feature that leads to a corresponding class label;
   wherein automatically generating the decision tree includes automatically selecting, at each step, the feature that maximizes information gain based on a current subset of data and classifying which conditioned feature along each path is a causal factor and which is a root cause by using a conditional entropy equation.

2. The method of claim 1, wherein the at least one event includes a defect.

3. The method of claim 1, wherein the at least one event includes a fault.

4. The method of claim 1, wherein the at least one event is associated with customer churn.

5. The method of claim 1, wherein the at least one event is associated with process quality assurance and optimization.

6. The method of claim 1, wherein the at least one event is associated with a failure in order activation.

7. The method of claim 1, wherein the one or more records include call detail records (CDRs).

8. The method of claim 1, wherein the current time window may be in seconds, minutes, or hours.

9. A computer program product embodied on a non-transitory computer readable medium, comprising computer code for:
   identifying, by a root cause analysis system, at least one event associated with one or more records for which to perform a root cause analysis; and
   performing, by the root cause analysis system, a root cause analysis of the at least one event by automatically generating a decision tree based on all records in a current time-window;
   wherein each leaf in the decision tree represents probabilities for class labels of a target variable and each branch in the decision tree represents a feature that leads to a corresponding class label;
   wherein automatically generating the decision tree includes automatically selecting, at each step, the feature that maximizes information gain based on a current subset of data and classifying which conditioned feature along each path is a causal factor and which is a root cause by using a conditional entropy equation.

10. The computer program product of claim 9, wherein the at least one event includes a defect.

11. The computer program product of claim 9, wherein the at least one event includes a fault.

12. The computer program product of claim 9, wherein the at least one event is associated with customer churn.

13. The computer program product of claim 9, wherein the at least one event is associated with process quality assurance and optimization.

14. The computer program product of claim 9, wherein the at least one event is associated with a failure in order activation.

15. The computer program product of claim 9, wherein the one or more records include call detail records (CDRs).

16. The computer program product of claim 9, wherein the current time window may be in seconds, minutes, or hours.

17. A root cause analysis system, comprising one or more processors operable for:
   identifying, by the root cause analysis system, at least one event associated with one or more records for which to perform a root cause analysis; and
   performing, by the root cause analysis system, a root cause analysis of the at least one event by automatically generating a decision tree based on all records in a current time-window;
   wherein each leaf in the decision tree represents probabilities for class labels of a target variable and each branch in the decision tree represents a feature that leads to a corresponding class label;
   wherein automatically generating the decision tree includes automatically selecting, at each step, the feature that maximizes information gain based on a current subset of data and classifying which conditioned feature along each path is a causal factor and which is a root cause by using a conditional entropy equation.

18. The system of claim 17, wherein the at least one event includes a defect.

19. The system of claim 17, wherein the at least one event includes a fault.

20. The system of claim 17, wherein the at least one event is associated with customer churn.

* * * * *